Sept. 18, 1945.    G. A. CARROLL    2,385,194
DEVICE FOR ELIMINATING BACKLASH
Filed July 31, 1944
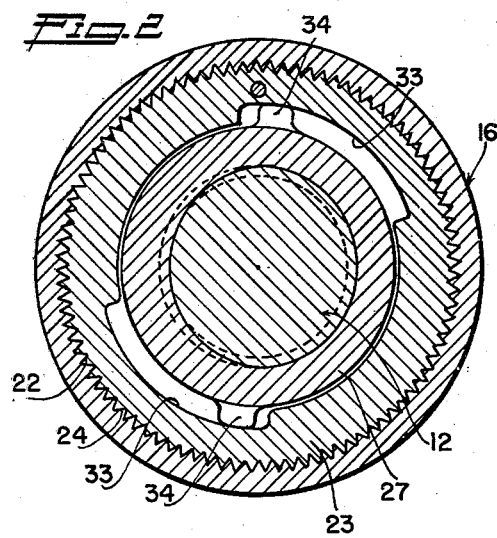
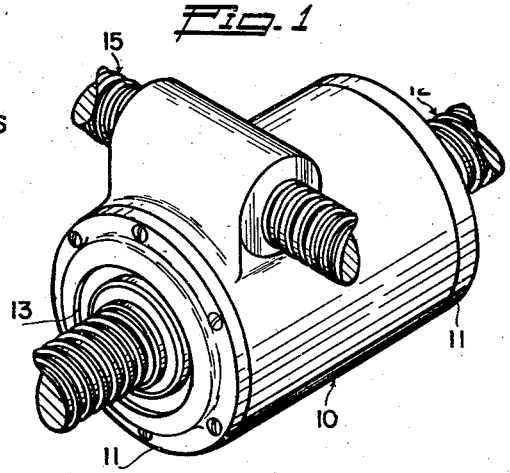
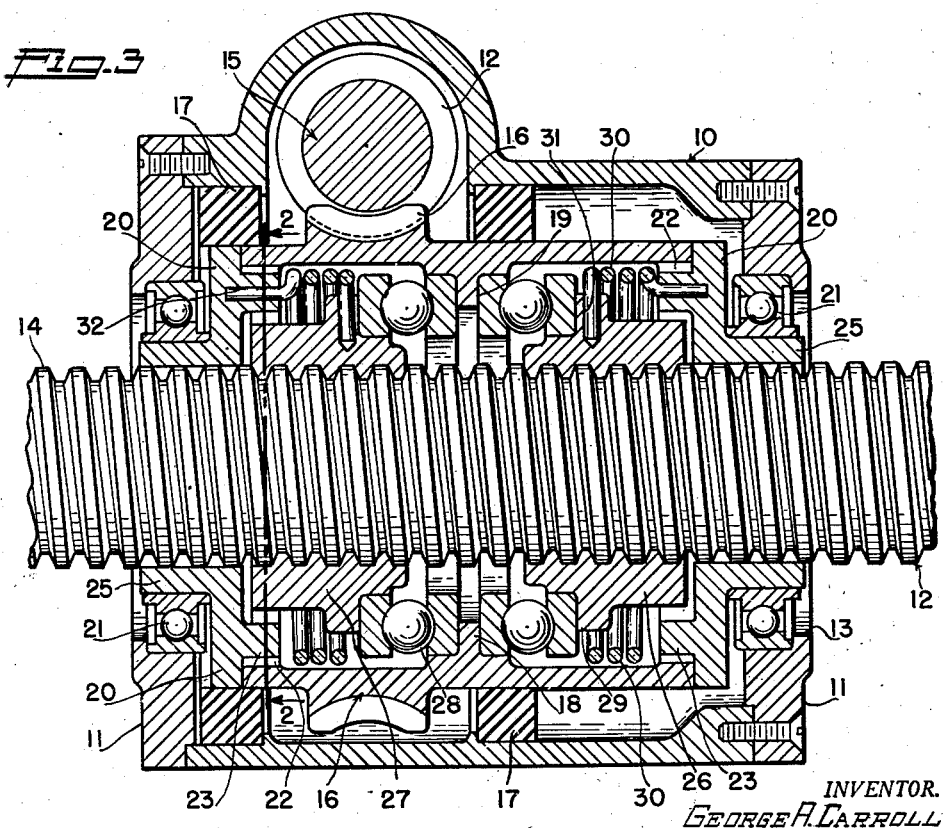
INVENTOR.
GEORGE A. CARROLL
BY
George C. Sullivan
AGENT Patented Sept. 18, 1945

2,385,194

UNITED STATES PATENT OFFICE 2,385,194

DEVICE FOR ELIMINATING BACKLASH

George A. Carroll, Glendale, Calif., assignor to Lockheed Aircraft Corporation, Burbank, Calif.

Application July 31, 1944, Serial No. 547,504

13 Claims. (Cl. 74—441)

This invention relates to actuating mechanisms, and relates more particularly to means for eliminating backlash in jack-screw devices and similar actuating mechanisms. It is a general object of the invention to provide a practical, dependable and very effective backlash eliminator for screw thread actuating or driving devices.

There are many applications of screw thread actuating mechanisms in which lost motion and backlash between the screw threads is highly objectionable or cannot be tolerated. As examples of such applications, the cowl flap jacks and tab operating mechanisms of aircraft and the feeds of various machine tools may be mentioned. In devices of such character, great care is used in machining the threads and the cooperating threaded parts are matched to reduce as far as possible, the lost motion and the backlash. Such precautions are unavailing because backlash develops as the threads wear and increases as the wear progresses.

It is an object of the invention to provide a backlash eliminator that is operative at all times and under all conditions of operation to prevent backlash in the screw thread actuating mechanism. The device is effective irrespective of whether the mechanism is employed to effect axial advance of the screw or axial advance of the traveler or nut unit, and does not require conditioning or control on the part of the operator. The device is fully automatic under all operating conditions, and is well suited for installation in remote or inaccessible locations where manual attention or control would be difficult or impossible.

Another object of the invention is to provide a device of the character referred to which compensates for wearing of the threads and which remains effective in preventing backlash and lost motion even after substantial wearing of the threads. In actual operation, the device may be set or adjusted to remain effective until the co-operating threads have been worn away to approximately 25% of their original thickness, and when such excessive wear has occurred, the device will allow play and backlash to develop to inform the operator that the unit requires replacement. This tell-tale feature of the invention may avoid a serious breakdown or failure of the machine with which the mechanism is associated.

Another object of the invention is to provide a mechanism of the character referred to that embodies adjustment means for insuring correct initial operation and subsequent or continued efficient and consistent operation. In devices of this nature, the parts may bind or lock up unless the correct setting or adjustment is provided and maintained. The present invention includes a simple adjustment means permitting the most desirable setting at the time of assembly or installation thereby eliminating the possibility of malfunctioning.

A further object of the invention is to provide a device of the character mentioned that is simple and inexpensive to manufacture, and that embodies a minimum number of sturdy durable parts.

Other objects and features of the invention will be readily understood from the following detailed description of a typical preferred embodiment throughout which description reference will be made to the accompanying drawing wherein:

Figure 1 is a perspective view of a device of the invention;

Figure 2 is an enlarged transverse detailed sectional view taken as indicated by line 2—2 on Figure 3; and, Figure 3 is an enlarged longitudinal detailed sectional view of the device.

The present invention is capable of embodiment in assemblies and mechanisms varying materially in nature and purpose. It is useful in situations where the screw is the driver and is rotated to cause advancement or axial movement of the nut unit or traveler and is equally useful in mechanisms where the nut unit constitutes the driver and serves to cause axial advancement of the screw. The invention is subject to modification to adapt it for use with various types and characters of such mechanisms. In the drawing, I have shown the invention incorporated in a device where the nut unit is the driving element which serves to produce axial movement of a screw normally held against rotation, it being understood that this is merely one form and application, and is not to be considered as limiting either the scope or application of the invention.

The mechanism illustrated includes a suitable housing 10 provided at its ends with end plates 11. A screw 12 extends longitudinally through the housing 10, the end plates 11 having openings 13 receiving the screw with considerable clearance. The screw 12 carries an acme thread 14 of the selected lead and pitch. The wall of the housing 10 is formed to receive a driving worm 15 having an axis of rotation spaced from and normal to the longitudinal axis of the screw 12. A worm wheel 16 is provided within the housing 10 and meshes with the worm 11 to be driven thereby. The worm wheel 16 is generally tubular in form and surrounds the screw 12 to be in spaced concentric relation thereto. Sealing rings 17 are engaged between the wall of the housing 10 and the wheel 16 at opposite sides of the meshing worm teeth to maintain lubricant at the worm gearing. The wheel 16 is provided with an annular internal flange 18 presenting oppositely facing abutments or thrust transmitting shoulders 19, the function of which will be later described.

The worm wheel 16 may be supported in the housing 10 in any appropriate manner. In the particular structure illustrated the wheel 16 is rotatably mounted through the medium of driving plates 20 and anti-friction bearings 21. The plates 20 are associated with the opposite ends of the wheel 16 and are annular in form to surround the screw 12 with clearance. In accordance with the invention, the driving plates 20 are capable of being indexed or adjusted to any selected angular positions. The end portions of the wheel 16 have annular series of serrations 22 and the inner sides of the driving plates 20 have annular flanges or rims 23 presenting mating annular series of serrations 24. The teeth or serrations 22 and 24 cooperate or mesh so that torque or angular movement is transmitted directly from the worm wheel 16 to the plates 20. The above mentioned anti-friction bearings 21 are arranged in surrounding relation to hubs 25 on the driving plates 20 and are engaged between the plates 20 and internal shoulders on the end plates 11. It is to be observed that upon removal of the end plates 11 of the housing 10 the drive plates 20 are readily accessible for adjustment.

The device further includes a pair of nuts 26 and 27 having threaded cooperation with the screw 12 to produce translation thereof upon rotation of the worm wheel 16. The nuts 26 and 27 are housed within the worm wheel 16 and have internal threads mating with the thread 14 of the screw 12. The nut 26 is spaced from the right side of the flange 18 as viewed in Figure 3, and the nut 27 is spaced to the left of the flange. The nuts 26 and 27 are in thrust transmitting association with the adjacent abutments or shoulders 19. It is preferred to interpose suitable anti-friction bearings 28 between the nuts 26 and 27 and their respective shoulders 19. In the drawing I have shown suitable ball bearings 28 engaged between ridges or flanges 29 on the nuts and the abutment shoulders 19.

The invention includes means for forcing or urging the nuts 26 and 27 toward their respective abutment shoulders 19 to maintain their threads in effective backlash-preventing engagement with the threads 14 of the screw 12. These means comprise torsional springs 30 connected between the nuts 26 and 27 and the rotatable worm wheel assembly. In the particular structure illustrated, the springs 30 are connected between the nuts and their adjacent or respective drive plates 20. The springs 30 may be simple helical springs surrounding the nuts with suitable clearance. The inner ends of the springs 30 are turned in to engage in openings 31 in the nut flanges 29 and the outer ends of the springs are received in openings 32 in the drive plates 20. The springs 30 are arranged to exert counter or opposite hand turning forces, and the directions of torque imposed by the springs are related to the direction of lead of the thread 14 on the screw 12 to normally cause the nuts 26 and 27 to be screwed or fed toward one another. Thus the springs 30 jam the nuts 26 and 27 against the bearings 28, which in turn thrust against the shoulders 19 of the worm wheel. As a result of this action the faces of the threads in the nuts 26 and 27 are maintained in firm contact with the opposite faces of the thread 14 on the screw 12.

That is, the right hand face of the thread in nut 26 is in pressure engagement with the left hand face of the thread 14, and the left hand face of the thread in nut 27 is in pressure contact with the right hand face of the screw thread 14. It should be noted that the action of the torsional springs 30 and the cooperation of the threads maintain the nuts 26 and 27 and their associated bearings 28 under compression between the shoulders 19 and the faces of the thread 14 on the screw 12. Accordingly, the torsional springs 30 not only eliminate lost motion between the nuts 26 and 27 and the screw 12, but also prevent lost motion between the nuts, the bearings 28 and the shoulders 19 so that there can normally be no play nor axial movement between the screw 12 and the worm wheel 16.

Operative or driving connections are provided between the nuts 26 and 27 and the worm wheel 16 so that rotation of the wheel may produce axial advancement or retraction of the screw 12. These driving connections are such that rotation of the worm wheel in either direction positively rotates one nut to produce advancement of the screw 12 while the other nut is left free to be held tightly against its bearing 28 by the related spring 30 to prevent backlash. The connections between the worm wheel assembly and the nuts 26 and 27 include arcuate slots or notches 33 in the driving plates 20; see Figure 2. There are preferably two diametrically opposite slots 33 in each plate 20 and the slots are of equal length or angular extent. Keys or lugs 34 are provided on the nuts 26 and 27 to operate in the notches or slots 33. As described above, the springs 30 rotate the nuts 26 and 27 in opposite directions so that the lugs 34 of one nut may occupy the forward end portions of their respective slots, while the lugs of the other nut may occupy the rear end portions of their respective slots.

In preparing or conditioning the device for operation, the end plates 11 and the bearings 21 are removed or withdrawn from the housing 10 to expose the drive plates 20. The drive plates are then moved away from the worm wheel 16 to disengage the serrations 22 and 24. The drive plates 20 are rotated to bring their lugs or drive keys 34 into the correct relationship to the slots 33. These adjustments are important in assuring proper functioning of the device. The adjustments are made with the nuts 26 and 27 in pressure engagement with their respective bearings 28 and the adjustments may be made to impose the required torque on the springs 30. The drive plates 20 may be readily adjusted individually to obtain the optimum performance of the device in the particular installation. Following the above adjustments, the bearings 21 and end plates 11 are restored to their original positions to secure the drive plates in the adjusted positions.

In the operation of the device, it will first be assumed that the worm wheel 16 is rotated in the clockwise direction as viewed in Figure 2. This rotation of the wheel 16 is transmitted to the left hand nut 27 by the end walls of the slots 33 of the related drive plate 20 coming into contact with the drive keys 34 of the nut. The engagement of the end walls of the slots 33 with the keys 34, provides for positive rotation of the nut 27 with the wheel. This positive rotation of the nut 27 produces axial movement of the screw 12. During this action the other nut 26 is free to turn on the screw 12 and is urged against its respective bearing 28 by the associated spring 30 exerting torque opposite to the direction of rotation of the wheel 16 and the nut 27. This maintained engagement of the nut 26 with its respective bearing 28 prevents backlash between the screw 12 and the nut assembly, even though there is substantial wear and play in the threads. The lugs or keys 34 on the right hand nut 26 are clear of the end walls of the associated slots 33, and accordingly, the nut 26 is free to rotate on the screw, with its spring 30 exerting the torque which maintains the nut in contact with its bearing. The action of the spring 30 in screwing or urging the nut 26 against its bearing 28 maintains the thread of the nut 26 in pressure engagement with the advancing or leading side face of the thread 14 on the screw 12. This cooperation of the threads effectively prevents backlash throughout the entire operation.

When the wheel 16 is rotated in the counter-clockwise direction as viewed in Figure 2, the nut 26 is positively driven or rotated with the wheel by reason of the fact that the advancing end walls of the related slots 33 come into engagement with the drive keys 34 of the nut. The positive rotation of the nut 26 with respect to the screw 12 produces advancement of the screw. Throughout this operation, the left hand nut 27 remains free with its drive keys 34 spaced from the end walls of the related slots 33 and the left hand nut is maintained in pressure engagement with its related bearing 28 by the action of the related torsional spring 30. This action of the spring on the nut 27 maintains the face of the thread in the nut in continuous contact with the leading side face of the thread 14 on the screw 12 to prevent backlash.

The slots 33 in the drive plates 20 may be of sufficient length or angular extent to assure freedom of the nut 26 or 27, when the same is inactive, so that the free nut actuated by its spring 30 may be effective in eliminating backlash without causing the device to bind or lock up. In initially adjusting or setting the drive plates 20, the slots 33 may be located with respect to the drive keys 34 to allow any desired free rotation of the wheel 16 to effect the release of the nut which is to remain idle and serve merely to prevent backlash. In practice I have found it desirable to initially set or adjust the plates 20 to allow an initial rotation of the wheel 16 of about 10° to free the idle nut 26. As the threads of the screw 12 and nuts wear, the slack rotation prior to positive driving of the screw 12 increases in extent. The slots 33 and drive keys 34 may be proportioned and related to allow this initial rotation to increase, by reason of thread wear, to any desired extent before the device allows backlash to develop. For example, the parts may be related to allow the threads to wear approximately 75% of their original thickness so that there is approximately 90° of slack angular movement or rotation of the nut assembly before the screw 12 is positively driven. When such excessive wear of the threads has occurred, the idle nut will no longer be free upon the screw 12, but its keys 34 will be engaged by the end walls of the related slots 33 and as a result the nut is no longer effective in preventing backlash so that end play and backlash develop in the threads. This informs the operator that the unit requires servicing or replacement.

It will be apparent that the actions above described will be the same in a mechanism wherein the screw 12 is the driving element and wherein the nuts 26 and 27 are carried by a traveler which is bodily advanced in an axial direction upon rotation of the screw. The mechanism may be varied to adapt it for widely different installations and applications. It is to be observed that the nuts 26 and 27, the torsional springs 30 and the adjustable driving means for the nuts may be conveniently embodied in structures differing materially in design, construction and purpose.

Having described only a typical form of the invention, I do not wish to be limited to the specific details herein set forth, but wish to reserve to myself any variations or modifications that may appear to those skilled in the art or fall within the scope of the following claims.

I claim:

1. A mechanism of the character described comprising two elements related for relative rotation, one a screw, the other a unit around the screw, abutments on the unit, nuts having threaded engagement with the screw, a separate lost motion driving connection between the unit and each nut, whereby rotation of one element relative to the other in either direction will produce advancement of the other element, spring means for urging one nut to turn in one direction to thrust against an abutment, and spring means for urging the other nut to turn in the other direction to thrust against the other abutment, the lost motion connections allowing one nut to remain in thrust engagement with its respective abutment by the action of its spring means while the other nut cooperates with the screw to cause relative axial movement between the elements.

2. A mechanism of the character described comprising a screw, spaced nuts having threaded engagement with the screw, a unit related to the screw for relative rotation and having an abutment between the nuts, spring means exerting opposite-hand torque on the nuts to cause them to screw against the abutment, and lost motion driving connections between the unit and nuts.

3. A mechanism of the character described comprising a screw, spaced nuts having threaded engagement with the screw, a unit related to the screw for relative rotation and having an abutment between the nuts, spring means exerting opposite-hand torque on the nuts to cause them to screw against the abutment, and lost motion driving connections between the unit and nuts including driving members capable of angular adjustment.

4. A mechanism of the character described comprising a screw, spaced nuts having threaded engagement with the screw, a unit related to the screw for relative rotation and having an abutment between the nuts, spring means exerting opposite-hand torque on the nuts to cause them to screw against the abutment, and lost motion driving connections between the unit and nuts, allowing one nut to remain in thrust engagement with the abutment while the other nut cooperates with the screw to produce relative axial movement between the screw and unit.

5. A mechanism of the character described comprising two elements related for relative rotation, one a screw, the other a unit around the screw, spaced nuts having threaded engagement with the screw, an abutment on the unit between the nuts, spring means exerting opposite-hand torque on the nuts to cause them to screw against the abutment, and lost motion driving connections between the unit and nuts, allowing one nut to remain in thrust engagement with the abutment while the other nut cooperates with the screw to produce relative axial movement between the screw and unit, said connections including driving members secured to the unit, and cooperable surfaces on the members and nuts.

6. A mechanism of the character described comprising a screw, spaced nuts having threaded engagement with the screw, a unit related to the screw for relative rotation and having an abutment between the nuts, spring means exerting opposite-hand torque on the nuts to cause them to screw against the abutment, and lost motion driving connections between the unit and nuts allowing one nut to remain in thrust engagement with the abutment while the other nut cooperates with the screw to produce relative axial movement between the screw and unit, each of said connections including a driving member for transmitting rotation to a nut, and means for securing the member to the unit in any one of a plurality of angular positions.

7. A mechanism of the character described comprising a screw and a unit around the screw, the screw and unit being related for relative rotation, abutment means on the unit, nuts at opposite sides of the abutment means having the threaded engagement with the screw, spring means exerting opposite hand torque on the nuts to cause them to be threaded along the screw and react against the abutment means, and slack connections between the nuts and said unit whereby upon relative rotation between the screw and unit one nut may remain in thrust transmitting engagement with the abutment means while the other nut produces relative axial movement between the screw and said unit, said connections each including a drive member for each nut cooperable with its respective nut, and means for securing the drive members to said unit in selected rotative positions.

8. A mechanism of the character described comprising a screw and a unit around the screw, the screw and unit being related for relative rotation, abutment means on the unit, nuts at opposite sides of the abutment means having the threaded engagement with the screw, spring means exerting opposite hand torque on the nuts to cause them to be threaded along the screw and react against the abutment means, and slack connections between the nuts and said unit whereby upon relative rotation between the screw and unit one nut may remain in thrust transmitting engagement with the abutment means while the other nut produces relative axial movement between the screw and said unit, said connections each including a projection on a nut, a drive member having spaced shoulders between which the related projection is received, and means for securing the drive member to said unit in any one of a plurality of rotative positions.

9. A mechanism of the character described comprising a screw and a unit around the screw, the screw and unit being related for relative rotation, abutment means on the unit, nuts at opposite sides of the abutment means having the threaded engagement with the screw, spring means exerting opposite hand torque on the nuts to cause them to be threaded along the screw and react against the abutment means, and slack connections between the nuts and said unit whereby upon relative rotation between the screw and unit one nut may remain in thrust transmitting engagement with the abutment means while the other nut produces relative axial movement between the screw and said unit, said connections each including a projection on a nut, a plate member having an arcuate opening receiving the projection with clearance, and means for securing the plate member to said unit in any one of a plurality of rotative positions.

10. A mechanism of the character described comprising a screw and a unit around the screw, the screw and unit being related for relative rotation, abutment means on the unit, nuts at opposite sides of the abutment means having threaded engagement with the screw, spring means exerting opposite hand torque on the nuts to cause them to be threaded along the screw and react against the abutment means, the spring means including an individual torsional spring acting on each nut, and lost motion connections between the nuts and said unit whereby upon relative rotation between the screw and said unit in either direction one nut will be urged against the abutment means by its respective spring while the other nut causes relative axial movement between the screw and said unit.

11. A mechanism of the character described comprising a screw and a unit around the screw, the screw and unit being related for relative rotation, abutment means on the unit, nuts on opposite sides of the abutment means having threaded engagement with the screw, a drive plate for each nut secured to said unit, means exerting opposite-hand torque on the nuts to cause them to be threaded along the screw to engage with the abutment means, the last named means including torsional springs connected between the nuts and their respective plates, and lost motion connections between the nuts and their respective plates.

12. A mechanism of the character described comprising a screw and a unit around the screw, the screw and unit being related for relative rotation, abutment means on the unit, nuts at opposite sides of the abutment means having threaded engagement with the screw, a drive plate for each nut adapted to be secured to said unit in any one of a plurality of different rotative positions, a torsional spring connected between each nut and its related plate, the springs exerting opposite-hand torque on the nuts so that the nuts are urged against the abutment means, and lost motion connections between the nuts and their respective plates.

13. An actuating mechanism including a screw arranged for axial movement, a tubular rotatable unit around the screw, drive means for rotating the unit, spaced nuts threaded on the screw within the unit, abutment means on the unit between the nuts, a drive plate for each nut, means for securing the drive plates to the unit in selected rotative positions, torsional springs connected between the nuts and their respective plates, the springs exerting opposite-hand torque on the nuts to be normally screwed against the abutment means, and lost motion connections between the nuts and their respective plates whereby upon rotation of said unit in either direction one nut is positively driven by the unit to react against the abutment means and produce axial movement of the screw and the other nut is held against the abutment means by its spring to prevent backlash.

GEORGE A. CARROLL.